Patented Feb. 20, 1940

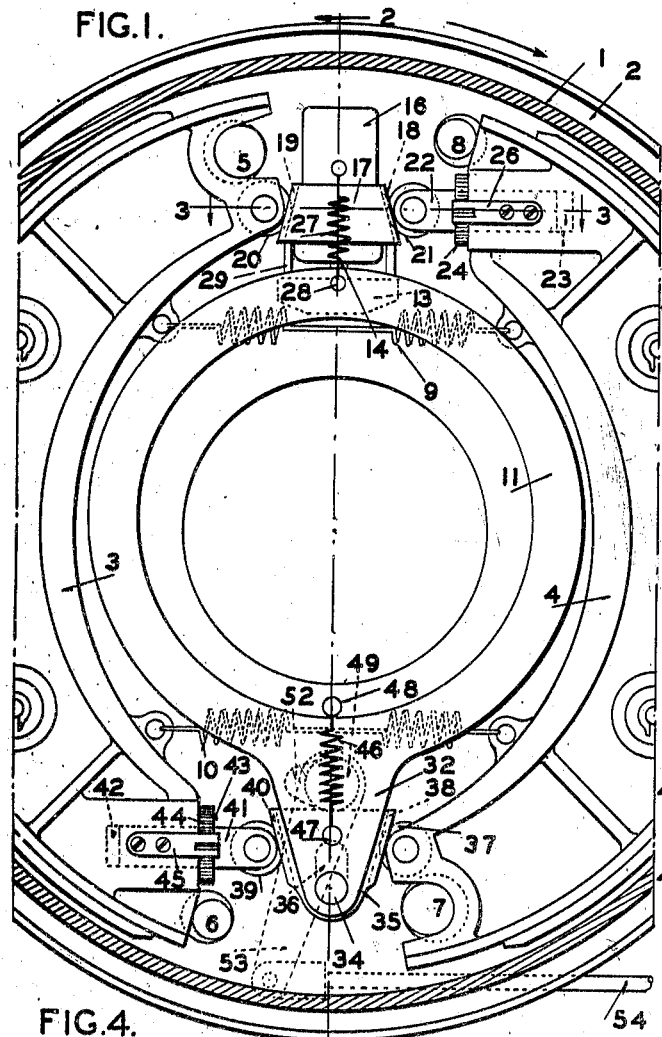
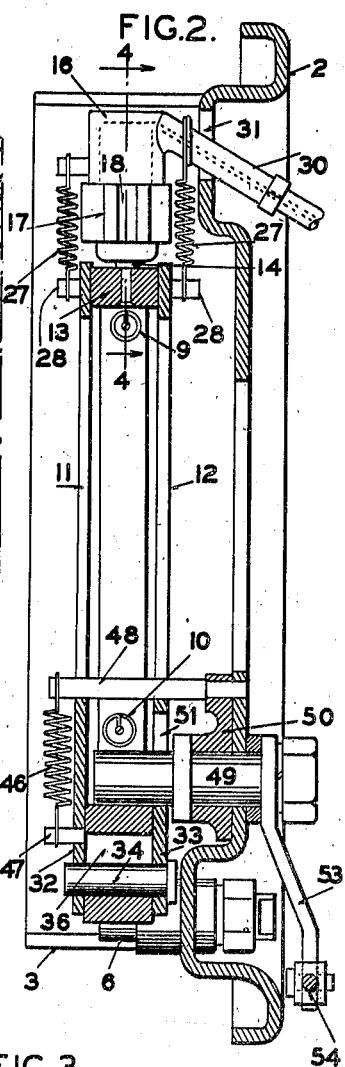
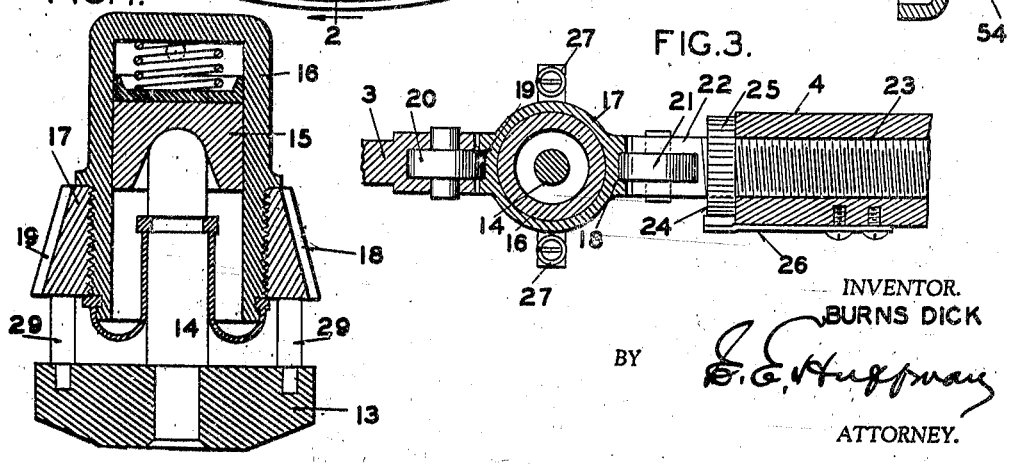

2,190,979

UNITED STATES PATENT OFFICE 2,190,979

BRAKING MECHANISM

Burns Dick, Ferguson, Mo., assignor to Wagner Electric Corporation, St. Louis, Mo., a corporation of Delaware Application May 16, 1938, Serial No. 208,121

10 Claims. (Cl. 188—152)

My invention relates to braking mechanism and more particularly to brakes of the two-shoe type which are positioned within the drum in end-to-end relation.

One of the objects of my invention is to produce a brake in which the adjacent ends of the shoes are actuated by two oppositely movable wedges and the shoes are capable of acting as "forward" shoes in both directions of rotation of the drum.

Another object of my invention is to produce an improved wedge-actuated brake in which two diametrically positioned wedges are adapted to be actuated by a single fluid motor and one of the wedges is adapted to be actuated by an auxiliary operating means independently of the fluid motor.

Other objects of my invention will become apparent from the following description taken in connection with the accompanying drawing in which Figure 1 is a side view, partly in section, of a brake embodying my invention; Figure 2 is a cross-sectional view taken on the line 2—2 of Figure 1, the drum being omitted; Figure 3 is a cross-sectional view taken on the line 3—3 of Figure 1; and Figure 4 is a cross-sectional view taken on the line 4—4 of Figure 2.

Referring to the drawing in detail, numeral 1 indicates the drum of the brake assembly which is secured to a vehicle wheel and 2 the backing plate enclosing the open side of the drum and being secured to some convenient fixed part of the vehicle. Within the drum are two shoes 3 and 4 positioned in end-to-end relation. The upper end of shoe 3 is notched for cooperation with an adjustable anchor pin 5 and the lower end of the shoe is formed with a straight surface for cooperation with an adjustable anchor pin 6. The shoes are normally held in their "off" position against their respective anchor pins by means of the springs 9 and 10 connected between the shoes.

The mechanism for actuating the shoes into engagement with the drum and which is an important feature of my invention comprises two spaced apart yoke members 11 and 12 which are positioned between the shoes in surrounding relation to the axis of the brake. The yoke members have secured therebetween a block 13 which carries a piston rod 14 for actuation by a piston 15 mounted for reciprocation in a vertically positioned cylinder 16 interposed between the upper adjacent ends of shoes 3 and 4. The external surface of the cylinder has threaded thereon an annular wedge member 17 which has formed on diametrically opposite sides thereof, grooves 18 and 19 inclined to the axis of the member. The upper end of shoe 3 has pivotally mounted thereon a roller 20 for cooperation with groove 19 and the upper end of shoe 4 carries a similar roller 21 for cooperation with groove 18. As best disclosed in Figure 3, roller 21 is pivotally mounted on the end of a threaded rod 22 which is slidably mounted in a socket 23 in the end of shoe 4. The rod and roller are adapted to be adjusted relative to the end of the brake shoe by means of a nut 24 which is threaded on the rod and abuts the shoe to hold the roller in its adjusted position. The outer surface of the nut is provided with serrations 25 for cooperation with a spring detent 26 for holding the nut in its adjusted position.

The piston 15 and cylinder 16 are held in their normal "off" positions by means of springs 27 connected at their upper ends to opposite sides of the cylinder and at their lower ends to pins 28 on the yoke members 11 and 12, the "off" positions being determined by the stop pins 29 carried by member 13. Fluid under pressure is conveyed to the cylinder through a suitable conduit 30 which passes through an oversize opening 31 in the backing plate whereby free movement of the cylinder will be permitted.

The lower portions of the yoke members 11 and 12 are provided with extensions 32 and 33 which project between the lower adjacent ends of shoes 3 and 4. These projections support a pivot pin 34 upon which is mounted a wedge member 35 positioned between the two projections. The pivot pin 34 is received in an elongated slot 36 in the wedge member in order to permit the wedge member to be moved relative to the pivot pin. The lower end of shoe 4 carries a roller 37 for cooperation with the groove 38 in one side of the wedge member and the lower end of shoe 3 carries a roller 39 for cooperation with the groove 40 in the other side of the wedge member. The roller 39 is mounted upon a threaded rod 41 which slidably projects into a socket 42 in the end of the shoe. The rod is adjusted relative to the shoe by the nut 43 which is provided with serrations 44 for cooperation with the holding detent 45.

The wedge member 35 is held in its normally inoperative position by means of spring 46 which has one end connected to a pin 47 on projection 32 of the yoke member 11 and the other end connected to a pin 48 secured to the backing plate, this latter pin acting as a stop against which spring 46 normally holds the yoke 11.

There is also shown auxiliary means for operating the wedge member 35 independently of the piston and cylinder which is employed to normally actuate the brake. This auxiliary actuating structure comprises a shaft 49 journaled in a bearing 50 carried by the backing plate, said shaft projecting through an opening 51 in the extension of yoke 12 and to a position where it overlies the upper edge of wedge member 35. The inner end of this shaft is formed with a cam surface 52 whereby rotation of shaft 49 will force the wedge member 35 downwardly independently of the yokes due to the slot 36 in the wedge. The shaft 49 is rotated by means of an arm 53, secured to the outer end of the shaft, and a connecting rod 54 leading to a suitable operating member positioned at a remote point, as for example, the operator's compartment of the vehicle.

When the drum is rotating in the direction indicated by the arrow and fluid under pressure is supplied to cylinder 16, the cylinder will be forced upwardly and the piston within the cylinder will be forced downwardly. The upward movement of the cylinder will result in the wedge member 17 forcing the upper ends of the brake shoes apart and into engagement with the drum and the downward movement of piston 15 will cause the yoke members 11 and 12 to be forced downwardly and also the wedge member 35, thereby forcing the lower ends of the shoes apart and into engagement with the drum. As the shoes are actuated into engagement with the drum, shoe 3 will anchor on pin 5 and shoe 4 will anchor on pin 7 due to the tendency of the shoes to move with the drum. Since the wedge member 17 is moved by cylinder 16 and the wedge member 35 is moved in the opposite direction by piston 15, the forces produced by the wedges to actuate the shoes into engagement with the drum will be equal. The yoke members 11 and 12 have sufficient free movement to permit the wedge members to shift slightly with the ends of the shoes in order to adjust themselves between the ends of the shoes.

When the drum is rotating in the direction opposite that indicated by the arrow and fluid pressure is applied to the cylinder and piston, the shoes will be forced into engagement with the drum in a manner already described but instead of anchoring on the anchor pins 5 and 7 they will anchor on the anchor pins 6 and 8. The shoes will now produce the same amount of braking torque as they did in the other direction of rotation of the drum as both shoes act as "forward" shoes. It is thus seen that the output of the brake is the same for either direction of rotation of the drum.

When it is desired to employ the auxiliary actuating means to actuate the brakes, rod 54 is operated to rotate shaft 49 and cam 52 and thus force wedge member 35 downwardly between the lower ends of shoes 3 and 4. This will cause the shoes to be spread apart and engage with the drum. If the drum is rotating in the direction indicated by the arrow, shoe 3 will act as a "forward" shoe and anchor on pin 5 and shoe 4 will act as a "reverse" shoe and be held in engagement with anchor pin 8 in the same manner as an ordinary two-shoe pivoted brake in which the shoes are pivoted at one pair of adjacent ends and actuated at the other pair of adjacent ends. When the drum is rotating in the direction opposite that indicated by the arrow and the auxiliary mechanism actuated, shoe 4 will anchor against pin 8 and become the "forward" shoe and shoe 3 will be held in engagement with anchor pin 5 and act as a "reverse" shoe.

From the foregoing description it is apparent that I have disclosed a two-shoe brake and means for actuating the same which permits both of the brake shoes to act as "forward" shoes in both directions of rotation of the drum. The construction permits each pair of adjacent ends of the shoes to be actuated by a wedge member and the wedge members to be controlled by a single fluid motor which produces equal forces on the wedge members. The auxiliary actuating mechanism is also so embodied in the brake that the shoes can be actuated by means of a single wedge and without the necessity of moving the yoke members or any of the parts of the fluid motor. Adjustment is also provided to compensate for wear of the linings of the brake shoes, which adjustment can be easily accomplished by merely rotating a nut.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a support, a rotatable drum, two shoes positioned in end-to-end relation in the drum, means for anchoring the shoes, a wedge for actuating one pair of adjacent ends of the shoes, a second wedge for actuating the other pair of adjacent ends of the shoes, a member connected to one wedge and extending to a point diametrically opposite said wedge and adjacent the other wedge, and a fluid motor having one of its movable elements connected to the member and its other movable element connected to the other wedge and adapted to move the wedges in opposite directions.

2. In braking mechanism, a support, a rotatable drum, two shoes positioned in end-to-end relation in the drum, means for anchoring the shoes, a wedge for actuating one pair of adjacent ends of the shoes, a second wedge for actuating the other pair of adjacent ends of the shoes, a yoke surrounding the axis of the brake and positioned between the shoes, means for pivotally connecting the first named wedge to the yoke, and a fluid motor connected to the other wedge and to the yoke at a point diametrically opposite the first named wedge and adapted to move the wedges in opposite directions.

3. In braking mechanism, a support, a rotatable drum, two shoes positioned in end-to-end relation in the drum, means for anchoring the shoes, a wedge for actuating one pair of adjacent ends of the shoes, a second wedge for actuating the other pair of adjacent ends of the shoes, a member connected to one wedge and extending to a point diametrically opposite said wedge and adjacent the other wedge, a cylinder secured to the other wedge, a piston in said cylinder, and a piston rod carried by the member and cooperating with the piston.

4. In braking mechanism, a support, a rotatable drum, two shoes positioned in end-to-end relation in the drum and each extending over substantially 180 degrees of the drum, means for anchoring the shoes, a wedge for actuating one pair of adjacent ends of the shoes, a second wedge for actuating the other pair of adjacent ends of the shoes, a member pivotally connected to one wedge and extending around the central part of the drum to a point diametrically opposite said wedge and adjacent the other wedge, and means cooperating with the member and the other wedge for moving said wedges in diametrically opposite directions and at right angles to the axis of the drum, said means permitting said last named wedge to have relative lateral movement with respect to the member.

5. In braking mechanism, a support, a rotatable drum, two shoes positioned in end-to-end relation in the drum, means for anchoring the shoes, a wedge for actuating one pair of adjacent ends of the shoes, a second wedge for actuating the other pair of adjacent ends of the shoes, a yoke surrounding the axis of the brake and positioned between the shoes, means for pivotally connecting one wedge to the yoke, a fluid motor connected to the other wedge and to the yoke at a point diametrically opposite the first named wedge and adapted to move the wedges in opposite directions, means permitting the pivotally connected wedge to be moved relatively to the yoke, and auxiliary actuating means for moving the pivotally connected wedge relative to the yoke.

6. In braking mechanism, a support, a rotatable drum, two shoes positioned in end-to-end relation in the drum, means for anchoring the shoes, a wedge for actuating one pair of adjacent ends of the shoes, a second wedge for actuating the other pair of adjacent ends of the shoes, a member connected to one wedge and extending to a point diametrically opposite said wedge and adjacent the other wedge, means cooperating with the member and the other wedge for moving said wedges in diametrically opposite directions and at right angles to the axis of the drum, means permitting said first named wedge to be moved independently of the member, and auxiliary actuating means comprising a rotatable cam for moving the first named wedge only.

7. In braking mechanism, a support, a rotatable drum, two shoes positioned in end-to-end relation in the drum, an anchor pin for each end of each shoe, the ends of the shoes which cooperate with the anchor pins in the normal forward direction of rotation of the drum being so associated with said pins that the end of the shoe is confined against radial movement but free to shift circumferentially away from the pin, a wedge for actuating one pair of adjacent ends, a second wedge for actuating the other pair of adjacent ends, a member connected to one of the wedges and extending to a point adjacent the other wedge, and means operating on said member and the other wedge for moving said wedges in opposite directions.

8. In braking mechanism, a support, a rotatable drum, two shoes positioned in end-to-end relation in the drum, means for anchoring the shoes, a wedge for actuating one pair of adjacent ends of the shoes, a second wedge for actuating the other pair of adjacent ends of the shoes, rollers pivotally mounted on the ends of the shoes for cooperation with the wedges, a member connected to one wedge and extending to a point diametrically opposite said wedge and adjacent the other wedge, means cooperating with the member and the other wedge for moving said wedges in diametrically opposite directions and at right angles to the axis of the drum, and means for adjusting one of the rollers on each shoe relative to the end of the shoe on which it is mounted.

9. In braking mechanism, a support, a rotatable drum, two shoes positioned in end-to-end relation in the drum, an anchor pin for each end of each shoe, the ends of the shoes which cooperate with the anchor pins in the normal forward direction of rotation of the drum being so associated with said pins that the end of the shoe is confined against radial movement but free to shift circumferentially away from the pin, a wedge for actuating one pair of adjacent ends, a second wedge for actuating the other pair of adjacent ends, rollers pivotally mounted on the ends of the shoes for cooperation with the wedges, a member connected to one of the wedges and extending to a point adjacent the other wedge, means operating on said member and the other wedge for moving said wedges in opposite directions, and means for adjusting the rollers which are mounted on the ends of the shoes not confined against radial movement.

10. In braking mechanism, a drum, two brake shoes positioned in the drum and having adjacent ends, fluid-operated means for actuating said shoe, said means comprising a movable cylinder positioned between the shoe ends, and an annular member adjustably mounted on the cylinder and provided with inclined surfaces on diametrically opposite sides thereof for cooperation with the shoe ends.

BURNS DICK.